United States Patent [19]

Gaillard

[11] Patent Number: 5,292,139

[45] Date of Patent: Mar. 8, 1994

[54] CLAMPING CHUCK FOR A MACHINE TOOL, ESPECIALLY AN AUTOMATIC MACHINE TOOL, AND A METHOD FOR PREPARING IT

[75] Inventor: Jean-Christophe Gaillard, Paris, France

[73] Assignee: Gamet Precision, S.A., Le Neubourg, France

[21] Appl. No.: 985,937

[22] Filed: Dec. 4, 1992

[30] Foreign Application Priority Data

Dec. 10, 1991 [FR] France .................. 91 15254

[51] Int. Cl.⁵ .............................................. B23B 31/16
[52] U.S. Cl. .................................. 279/123; 51/281 R; 279/110
[58] Field of Search .......................... 279/123, 110

[56] References Cited

U.S. PATENT DOCUMENTS 1,500,637  7/1924  Pilar ........................ 279/110 X
2,513,284  7/1950  Church ........................ 279/123

FOREIGN PATENT DOCUMENTS 800201    7/1949  Fed. Rep. of Germany .
3838347   5/1990  Fed. Rep. of Germany .
1013861   3/1950  France .
660780   11/1951  United Kingdom ............... 279/123

Primary Examiner—Steven C. Bishop
Attorney, Agent, or Firm—Fitzpatrick, Cella, Harper & Scinto

[57] ABSTRACT

A clamping chuck comprising a body (1) having a front face provided with radial cuts (3), and jaw holders (4) carrying clamping jaws and sliding in said radial cuts, each side face of the jaw holders carrying at least two slideways, preferably 4 to 8, interacting with a corresponding number of slideways provided on the side faces of said radial cuts, the slideways being so flexible that all the slideways take part in the guiding of the jaw holder in spite of possible machining tolerances.

13 Claims, 2 Drawing Sheets

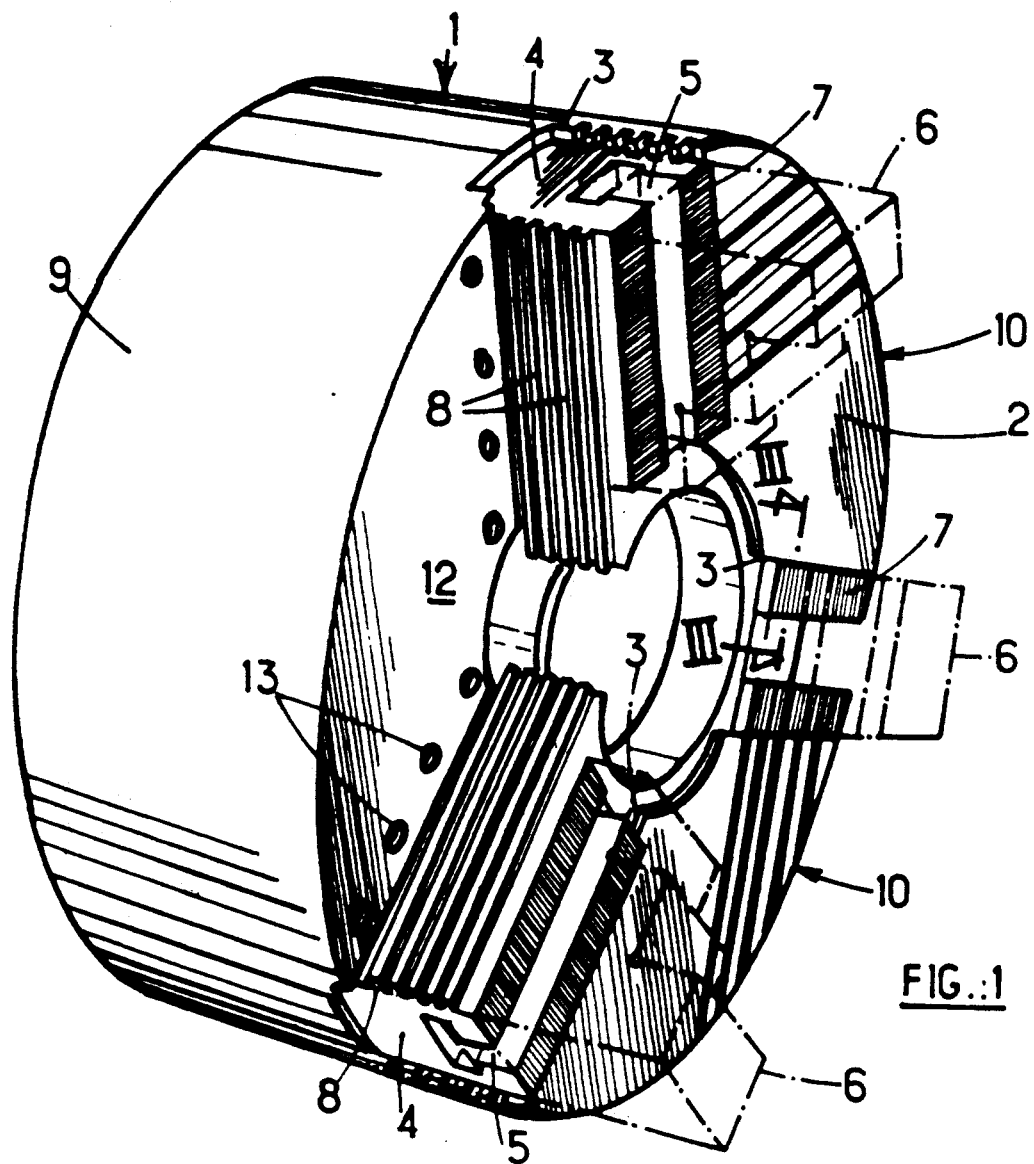
FIG.:1
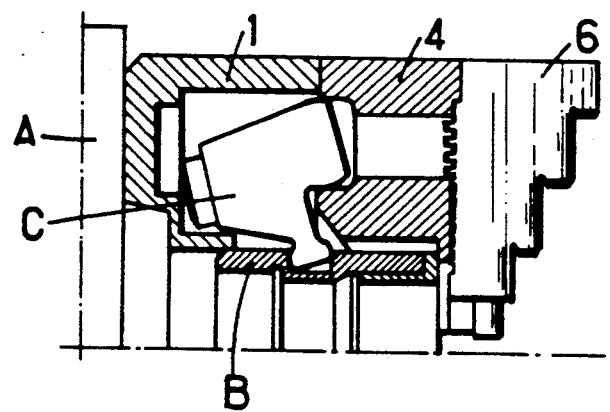
FIG.:4

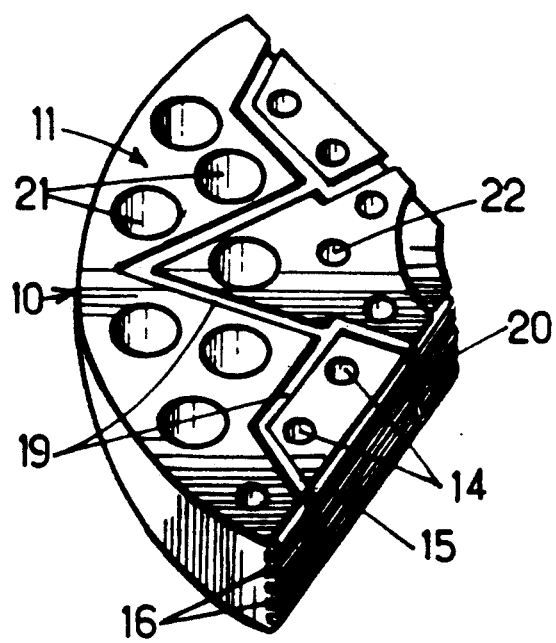
FIG.:2
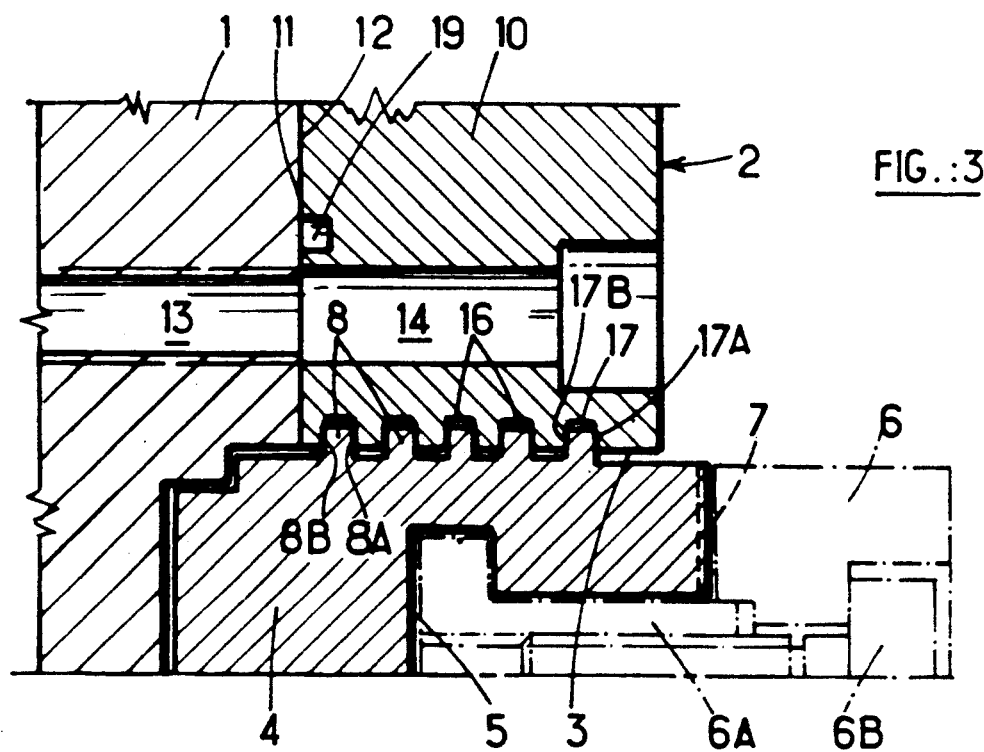
FIG.:3

CLAMPING CHUCK FOR A MACHINE TOOL, ESPECIALLY AN AUTOMATIC MACHINE TOOL, AND A METHOD FOR PREPARING IT

The present invention relates to a clamping chuck for a machine tool, especially an automatic machine tool.

The present invention results from the following observation: during the machining of a workpiece, it is often necessary, in a first instance, to clamp the workpiece tightly, for example during its blank stage and, in a second instance, to have a low clamping force so as not to deform the workpiece, for example during finishing.

For chucks of the current art, a decrease in this clamping force may only be noted when the control force of the chuck is substantially decreased, for example in a ratio of 8 to 1.

This spread between the decrease in the control force and that in the clamping force results from the poor reversibility of the mechanism transforming the control force into a radial clamping force, a phenomenon which is also called hysteresis.

The applicant company has studied the causes of this spread and observes that one of these causes could be found in the slideways which guide the jaw holders in their radial movement so as to clamp the workpiece.

"Slideway" is considered here to mean a rib having two sliding surfaces oriented in opposite directions, this rib being intended to penetrate a groove of the antagonistic component. A rib which has only one sliding surface will not be designated by "slideway" in the present text. The number of slideways of a component corresponds to an equal number of grooves on the antagonistic surface, and the projecting parts of this antagonistic surface situated between said grooves constitute, in turn, slideways whose number is one less than that of the grooves of the same surface.

Usually, the jaw holder comprises a rigid extension, extended radially and having a T-shaped cross-section, which can slide in a radial cut of corresponding cross section, open on the front frontal face of the body. The transverse branches of the T each constitute a slideway. Their two surfaces oriented axially are machined with care, as are the corresponding surfaces of the cut, and there is, at rest, a very small clearance between the surfaces which face one another.

When a workpiece is clamped from the outside, the slideway is stressed axially in the direction of the front of the chuck in its part which is radially closest to the axis, and in the opposite direction in its radially external part. The opposite occurs in the event of the workpiece being hollow and clamped from the inside.

It will be noted that, in the chucks intended to equip a machine tool, the stresses which the slideways undergo are very high, due, on the one hand, to the extent of the clamping forces, and, on the other hand, to the short length of the slideways, which is limited by the radial dimension of the chuck.

The friction between corresponding surfaces depends on numerous factors, among which are the nature of the materials used to constitute these surfaces, their surface finish, the nature of the lubricant and the pressures exerted.

It is known that if two surfaces are kept bearing against one another with a significant pressure and during a certain time without displacement, the film of lubricating substance which initially exists between these surfaces tends to deteriorate with a significant increase in the friction. It therefore appears advantageous to reduce the pressure which is exerted on the contacting surfaces.

Clamping chucks are known in which the radial cuts and the corresponding parts of the jaw holder, are double T-shaped instead of being single T-shaped.

It will be noted that each lateral face of the jaw holder therefore comprises two slideways, separated by a groove, whilst the wall of the groove which faces it has one slideway surrounded by two grooves.

The dimensions of each slideway of the jaw holder are more or less the same as for a single T-shaped arrangement, and the rigidity of the chuck body is obtained by increasing its dimension in the axial direction by a length which is more or less equal to the increase in depth of the cut.

It could have been thought that since the number of contacting surfaces was doubled, the pressure, and therefore the friction, would be reduced. The inventors observed, with surprise, that such an effect was nowhere apparent, and that in fact it was not noticed. It seems that the expected advantages of the "double T" result essentially from a better resistance to wear: on a new chuck, only one of the slideways is usually stressed, it wears progressively until the second can come into action, and, from this moment, the wear of each slideway decreases.

The applicant company nevertheless continued its research, and observed that a surprising reduction in the spread mentioned above could be obtained, in the case of slideways with multiple guiding surfaces, if certain conditions were respected. It is these conditions which form the subject of the present invention.

The invention consequently provides a clamping chuck for a machine tool, comprising:
- a body, of generally cylindrical shape with a rear frontal face intended to be fixed to the machine tool and a front frontal face directed towards a workpiece to be clamped, having radial cuts opening onto its front frontal face, the lateral walls of each cut comprising several radial slideways,
- jaw holders, which carry clamping jaws, part of which can be engaged in one of said cuts and carries, on each of the two circumferentially opposed faces, at least two slideways having frontal sliding surfaces capable of interacting, in order to guide the jaw holder radially, with corresponding surfaces of the lateral wall of said cut,
- control members placed in the body and able simultaneously to displace the jaw holders in the direction of a workpiece to be clamped, and to apply a radial clamping force to said jaw holders, this chuck having the particular feature that the slideways have a flexibility such that the axial displacement of the sliding surfaces connected to the jaw holder relative to a fixed reference connected to the jaw holder, and the axial displacement of the sliding surfaces connected to the body relative to a fixed reference connected to the body, which displacements result from the elastic deformation of the slideways under the effect of the forces corresponding to clamping, are greater than the possible spreads resulting from machining tolerances, between the axial distances separating sliding surfaces oriented in the same direction.

The invention consequently introduces a notion of minimum flexibility of the slideways, which notion opposes the normal teaching which envisages that the slideways are to be as rigid as possible. It is this flexibility which ensures that the sliding surfaces all interact in taking up the forces due to clamping.

Of course, the flexibility of the slideways has a maximum limit which corresponds to the fact that they must transmit the forces which result from clamping the jaws on the workpiece to be treated to the body of the chuck, each slideway only withstanding part of these forces, but the deformations having to remain within the elastic region.

The determination of the displacement of the sliding surfaces can be achieved, in theory, in a simple fashion, knowing the modulus of elasticity of the material of the slideways and the axial dimension of the latter, by applying to them the load resulting from the clamping forces, divided by the number of slideways.

Nevertheless, an approximated determination may be achieved in an even simpler fashion by simply considering the thickness of the slideways. It has been observed that, for a steel chuck developing a total clamping force of 400 to 16,000 daN, which corresponds, in the current art, to a chuck diameter of 80 to 250 mm, slideways can be used of a thickness lying between 1 and 5 mm, the thickness being the distance between the two sliding surfaces of the same slideway. For chucks of the same type developing a total clamping force of 16,000 daN to 26,000 daN, which corresponds to a chuck diameter of 250 to 450 mm, slideways can be used with a thickness lying between 2 and 8 mm, provided that the number of slideways is matched to the clamping force.

This number of slideways, for the clamping forces indicated above, is greater than three, and preferably lying between four and ten.

The specification indicated above, relating to the maximum thickness of the slideways, is equivalent, when using steel chucks of the usual type, to the theoretical specification given above and which relates to the flexibility of the same slideways.

The small thickness, or axial dimension, of the slideways makes it possible to increase the number of the latter without increasing the depth of the cut of the body, and consequently, without significantly modifying the axial dimensions of the chuck body and of the jaw holder relative to the conventional single T-shaped arrangement. This would not have been possible following the teachings of the prior art, because the need for rigid and thus very thick slideways would have necessitated a prohibitive increase in the axial dimension of the jaw holders and of the body, corresponding to the increase in the number of slideways.

The presence of multiple slideways has the consequence that the usual machining technique by milling the sliding surfaces in the mass of the body becomes difficult to use, taking account of the fact that the machining tolerances must be reduced.

In order to overcome this difficulty, the applicant company has designed a new chuck body structure. According to the latter, the body is made from several parts: a rear-body made in one piece and a number of front-bodies equal to the number of jaw holders, each front-body being in the shape of a section of a circle, with sliding surfaces on its radial sides, the front-bodies being fixed to a frontal face of the rear-body so as to define between them the cuts in which the jaw holders slide.

In this way, the slideways can be made both on the body and on the jaw holder, by the milling technique using large-diameter grinding wheels.

The invention therefore also provides a preferred method for obtaining a chuck of the type which has just been described. According to this method, in order to prepare the sliding surfaces on the front-bodies and on the jaw holders, a grinding wheel is used whose axis is parallel to the direction of the axis of the body and whose periphery has a series of grooves and circular ribs with square cross section, all of the same width, and the operation is carried out according to the so-called creep-feed technique, by which grooves are formed in a single pass in the front-body or the jaw holder, the same mill being used in order to form the front-body and the jaw holders.

In this way, particularly reduced machining tolerances are obtained, which is advantageous if reference is made to the first-given definition of the invention.

Furthermore, it has been observed that this operational mode provides finely polished sliding surfaces, which are particularly well adapted to maintaining the film of lubricant under the reduced pressures which result from the structure of the invention.

Under these conditions, it was possible to observe that a significant release in clamping was obtained with a reduction of the control force in a ratio of only 3 to 2. As a corollary, the clamping force is transmitted with a particularly high efficiency. This efficiency in fact reaches 90%, whereas, according to the prior art, 70% appeared to be a maximum which it was impossible to exceed.

The invention will now be described in a more detailed fashion with the aid of a practical example illustrated with the aid of the drawings amongst which:

FIG. 1 represents, in perspective, a chuck in accordance with the present invention, given by way of example, with one front-body element removed.

FIG. 2 represents, also in perspective, a dismantled front-body element.

FIG. 3 is an enlarged partial section of part of the chuck along the plane III—III parallel to the axis.

FIG. 4 is a very diagrammatic axial section of the chuck body.

FIG. 1 shows a chuck body 1, of generally cylindrical form and which has, on its front frontal face 2, three radial cuts 3, in each of which a jaw holder 4 can slide. Each jaw holder has a radial groove with a T-shaped cross section 5, which holds a jaw 6 represented in dot-and-dash line in the Figure, by virtue of T-shaped nuts 6A, which bear on the internal face of the groove 5 and are clamped against it by screws 6B. Serrations 7, carried by the frontal face of the jaw holder and the corresponding face of the jaw, make it possible to adjust the radial position of the latter.

As FIG. 4 shows, the body 1 is mounted on a machine tool, represented diagrammatically and partially with the reference A.

Inside the body 1, means are provided for causing the jaw holder 4 to slide in the cut 3, these means comprising a control ring B, which can be displaced along the axis of the body, and whose axial displacement is transformed into a radial displacement of the jaw holder by virtue of a driving component forming a lever C, which can pivot about a pivoting axis perpendicular to the axis of the body and not crossing it. This arrangement is conventional. It will be noted that there are also, in practice, devices for transforming the axial movement of the control ring into a radial movement of the jaws with the aid of a ramp with oblique surface. This is not the preferred arrangement. In fact, its nature is to lead to spreads between clamping and unclamping forces, which spreads are greater than those which result from a lever transmission.

The particular feature of the invention appears clearly in FIG. 1, when the lateral faces of the jaw holders are examined. These faces, in fact, each have five slideways 8, that is to say five ribs of square cross section, substantially parallel to the radii of the cylindrical body, which pass through the plane of symmetry of the jaw holder, and limited by frontal surfaces 8A, 8B directed respectively towards the front and towards the rear. A person skilled in the art immediately sees the difference from a conventional jaw holder which carries only a single slideway on its lateral face, the jaw holder assembly having, in the axial direction, a dimension substantially equal to that of the jaw holder which is currently being described. According to the prior art, if the jaw holder carries two slideways, for a double T-shaped structure, its dimension in the axial direction is distinctly greater.

Although the slideways 8 are of "square" cross section, that is to say with the sliding surfaces perpendicular to the overall plane of the face which carries them, they can also, without departing from the scope of the invention, be trapezoidal, that is to say with their sliding surfaces spreading by a few degrees from the perpendicular to the plane of the face, or have some other cross section.

The body 1 is composed of a cylindrical rear part 9, made in a single piece, and of three front-bodies 10, fixed to the rear part. These front-bodies have more or less the shape of a sector of a circle, and they define between them the cuts 3. In FIG. 2, one of these front-bodies 10 has been represented dismantled and placed so that its rear face 11 can be seen. This rear face 11 is plane and comes to bear on the plane front frontal face 12 of the rear part 9 of the body. It is fixed to this face by virtue of screws, not represented, placed in bores 13, 14 situated close to the radial edge of each front-body 10. The front frontal faces of the front-bodies constitute the frontal face 2 of the body, into which the cuts 3 open. The rectilinear lateral faces 15 of each front-body, which are more or less radial, each have five grooves 16, with square cross section, of dimensions matched to those of the slideways 8 limited by frontal surfaces 17A, 17B directed respectively towards the front and towards the rear, and separated by four ribs themselves forming slideways for the jaw holder.

As FIG. 3 clearly shows, the jaw holder 4 and the chuck body are practically in contact only via the frontal sliding surfaces 8A, 8B, 17A, 17B of the slideways 8 and of the grooves 16, which ensures minimum friction.

It will be noted that the rear frontal face 11 of a front-body 10 furthermore has grooves 19 intended to facilitate the access of a lubricant to the slideways, by means of channels 20 directed axially, non-traversing lightening spaces 21, and a cavity 22 for a centering pin. The grooves 19 could be provided in the front frontal face 12 of the rear-body, or on the two frontal faces 11 and 12 which bear against one another.

In the example described, which corresponds to a chuck of 210 mm diameter, in which the normal clamping force is 10,000 daN, the thickness of the slideways of the jaw holder and of the front-bodies is approximately 2.5 mm. The machining tolerances are approximately 5 micrometers.

The fact that the front-bodies 10 can be dismantled makes it possible to machine them by creep-feed milling with the same grinding wheel as the jaw holders 4. This grinding wheel has annular ribs of rectangular cross section, separated by grooves of the same shape and same width as these ribs.

What is claimed is:

1. A clamping chuck for a machine tool, comprising:
a body, having a substantially cylindrical shape, said body having a rear frontal face configured to be fixed to the machine tool and an anterior frontal face directed towards a workpiece to be clamped, and having lateral walls defining radial cuts opening onto the anterior frontal face, the lateral walls comprising a plurality of first radial slideways having first frontal sliding surfaces, jaw holders, for carrying clamping jaws, part of said jaw holders being configured to be engaged in one of the radial cuts, the part having two circumferentially opposed faces, and having on each of the two circumferentially opposed faces at least two second slideways having second frontal sliding surfaces for interacting with the first sliding surface, to guide the jaw holder radially, control members placed in said body and able simultaneously to displace said jaw holders in the direction of a workpiece to be clamped, and to apply a predetermined radial clamping force to said jaw holders, this force having the result that the first and second sliding surfaces are displaced axially relative to said body and to said jaw holder respectively, following an elastic deformation of the first radial slideways and second slideways, the flexibility of the first radial slideways and second slideways being calculated and chosen so that the axial displacements of the first sliding surfaces and the second sliding surfaces are greater than the spreads which may exist between the axial distances separating two first sliding surfaces and two second sliding surfaces, wherein these spreads are the result of machining tolerances.

2. A clamping chuck for a machine tool, comprising:
a body, having a substantially cylindrical shape, said body having a rear frontal face configured to be fixed to the machine tool and a front frontal face directed towards a workpiece to be clamped, and having lateral walls defining radial cuts opening onto its front frontal face, the lateral walls comprising a plurality of first radial slideways having first sliding surfaces, jaw holders, for carrying clamping jaws, part of said jaw holders being configured to be engaged in one of the radial cuts, the part having two circumferentially opposed faces, and having on each of the circumferentially opposed faces at least two second slideways having second frontal sliding surfaces for interacting with the first sliding surfaces, to guide the jaw holder radially, control members placed in said body and able simultaneously to displace said jaw holders in the direction of a workpiece to be clamped, and to apply a radial clamping force to said jaw holders, in which the radial slideways of said jaw holder and the second slideways of said body have a thickness lying between 1.25 and 5 mm for a steel chuck developing a total clamping force of 400 to 16,000 daN, and a thickness lying between 2 and 8 mm for a steel chuck developing a total clamping force of 16,000 to 26,000 daN, with the number of radial slideways of said jaw holder and of second slideways of said body being a direct function of the clamping force.

3. The chuck of claim 1, in which each of the opposed faces of said jaw holder comprises at least three second slideways, and the lateral walls of the radial cuts of said body comprise at least two first radial slideways.

4. The chuck of claim 2, in which each of the opposed faces of said jaw holder comprises at least three second slideways, and the lateral walls of the radial cuts of said body comprise at least two first radial slideways.

5. The chuck of claim 2, in which the number of second slideways situated on each of the opposed faces of said jaw holder lies between 4 to 10 for a chuck of a diameter lying between 80 and 450 mm, and developing a total clamping force lying between 400 and 26,000 daN.

6. The chuck of claim 1, in which said body is made from several parts: a rear-body made in one piece and a plurality of front-bodies the number of which equals the number of said jaw holders, each front-body being in the shape of a section of a circle, with sliding surfaces on its radial sides, the front-bodies being fixed to a frontal face of the rear-body so as to define between them the cuts in which said jaw holders slide.

7. The chuck of claim 2, in which said body is made from several parts: a rear-body made in one piece and a plurality of front-bodies the number of which equals the number of said jaw holders, each front-body being in the shape of a section of a circle, with sliding surfaces on its radial sides, the front-bodies being fixed to a front face of the rear-body so as to define between them the cuts in which said jaw holders slide.

8. The chuck of claim 6, in which the rear-body and the front-bodies bear against each other via plane frontal surfaces, at least one of which has grooves intended to facilitate the access of lubricant to the slideways.

9. The chuck of claim 7, in which the rear-body and the front-bodies bear against each other via plane frontal surfaces, at least one of which has grooves intended to facilitate the access of lubricant to the slideways.

10. A method for preparing the sliding surfaces on said front-bodies and on said jaw holders of a chuck as claimed in claim 6, in which a grinding wheel is used whose axis is parallel to the direction of the axis of the body and whose periphery has a series of circular ribs and grooves, all of the same width, and the operation is carried out according to the so-called creep-feed technique, by which grooves are formed in a single pass in said front-body or said jaw holder, the same wheel being used in order to form the front-body and said jaw holders.

11. A method for preparing the sliding surfaces on said front-bodies and on said jaw holders of a chuck as claimed in claim 7, in which a grinding wheel is used whose axis is parallel to the direction of the axis of the body and whose periphery has a series of circular ribs and grooves, all of the same width, and the operation is carried out according to the so-called creep-feed technique, by which grooves are formed in a single pass in said front-body or said jaw holder, the same wheel being used in order to form said front-body and said jaw holders.

12. The chuck of claim 6, wherein the sliding surfaces are finely polished by a grinding wheel whose axis is parallel to the direction of the axis of said body and whose periphery has a series of circular ribs and grooves, all of the same width, and polishing of a sliding surface is carried out with a so-called creep-feed technique, by which grooves are formed during a single pass in said front-body or said jaw holder, and the same wheel is used to form said front-body and said jaw holders.

13. The chuck of claim 7, wherein the sliding surfaces are finely polished by a grinding wheel whose axis is parallel to the direction of the axis of said body and whose periphery has a series of circular ribs and grooves, all of the same width, and polishing of a sliding surfaces is carried out with a so-called creep-feed technique, by which grooves are formed during a single pass in said front-body or said jaw holder, and the same wheel is used to form said front-body and said jaw holders.

* * * * *